Aug. 22, 1944.　　　C. M. ANDERSON　　　2,356,371
DRAW WORKS
Original Filed April 26, 1940　　2 Sheets-Sheet 1

Inventor
CARL M. ANDERSON
By Lester B Clark
Attorney

Aug. 22, 1944.  C. M. ANDERSON  2,356,371
DRAW WORKS
Original Filed April 26, 1940  2 Sheets-Sheet 2

Inventor
CARL M. ANDERSON
By Luter B Clark.
Attorney

Patented Aug. 22, 1944

2,356,371

UNITED STATES PATENT OFFICE 2,356,371

DRAW WORKS

Carl M. Anderson, Corsicana, Tex., assignor to American Well & Prospecting Company, Corsicana, Tex.

Original application April 26, 1940, Serial No. 331,703, now Patent No. 2,303,071, dated November 24, 1942. Divided and this application October 17, 1941, Serial No. 415,471

5 Claims. (Cl. 254—187)

The invention relates to hoisting devices and has particular application to draw works to be employed in oil field operations for raising and lowering loads such as drill pipe and the like in the well.

This application is a division of my prior copending application Serial No. 331,703, filed April 26, 1940, now Patent No. 2,303,071, dated November 24, 1942.

The ordinary draw works has in connection therewith a power transmission mechanism by means of which various speeds of rotation may be communicated to the hoisting reel. Such mechanism includes a jack shaft, operated from a source of power, a line shaft, and a drum shaft. In constructions now commonly used, in order to provide a plurality of speeds to the draw works, it is customary to drive from the jack shaft up to the lineshaft and from the lineshaft down to the drumshaft. This construction induces heavy stresses high up on the draw works frame structure, which in turn makes necessary very heavy bases to resist the heavy loads and vibration at high speed.

It is an object of this invention to provide a maximum number of speed changes between the jack shaft and the drum shaft with the minimum number of connections between those shafts.

The general object of the invention is to provide a draw works wherein the drum shaft may be driven at a maximum number of speeds from a drive shaft through a minimum number of transmission connections.

Another object of the invention is to provide a support for the three shafts of the draw works which have previously been indicated, which will be compact in form and particularly strong and durable but relatively light in weight. I desire to employ but one set of posts and to mount upon the base adjacent the post the bearings for the shafts in a particularly strong and durable construction.

Other objects are:

To provide a draw works wherein all chains are stationary while drilling (i. e. when jackshaft only is turning to drive rotary sprockets, all other chains to line-shaft and drumshaft are stationary).

To provide a draw works with center of load low with respect to supporting base, thereby eliminating necessity of very heavy frame.

To provide a simple and compact assembly in which all chain and moving parts may be completely enclosed, not only for safety but also for simplicity of lubrication.

A better understanding of the invention may be had by reference to the drawings herewith wherein.

Figure 1:
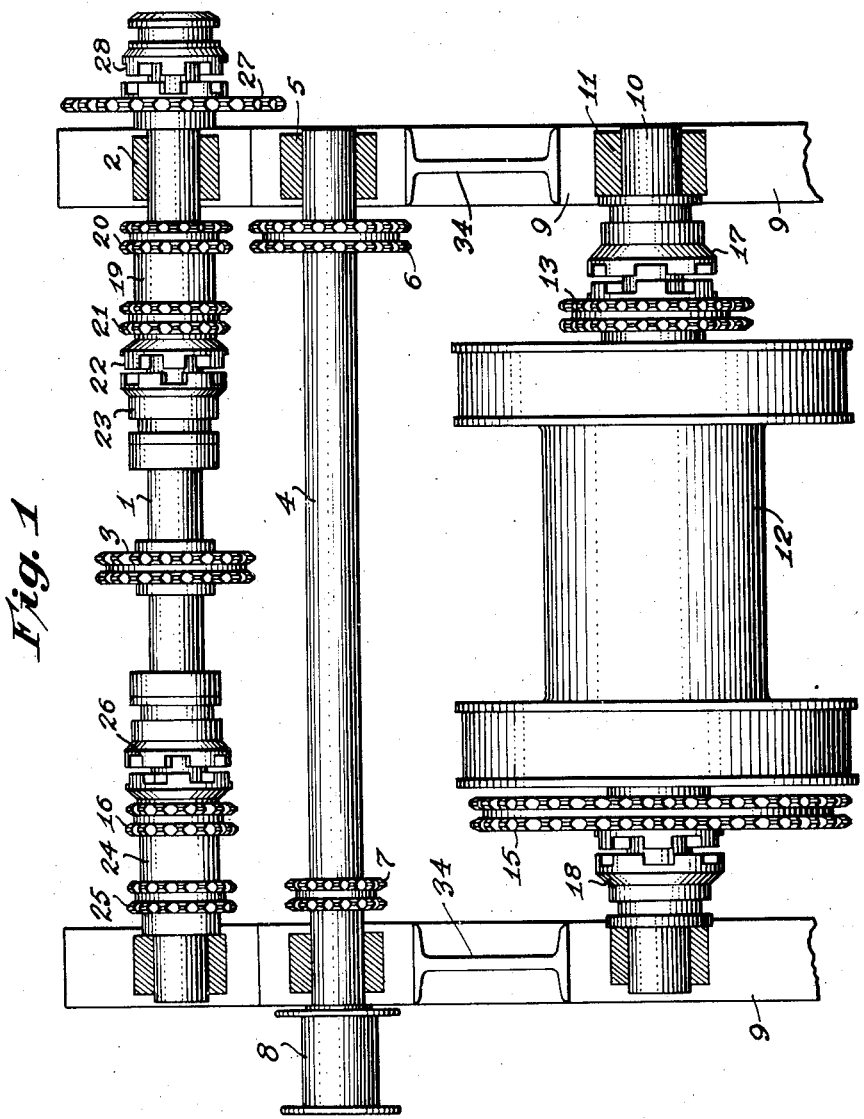
Fig. 1 is a broken top plan view of a draw works embodying the invention.

In the drawings I have shown a drive or jack shaft 1 mounted in bearings 2 at its ends and adapted to be rotated through a driving connection from a source of power to sprocket wheels 3 approximately midway between the ends of the shaft. A line shaft 4 is mounted upon the base in bearings 5 at its ends, said shaft being provided with a sprocket wheel 6 at one end and a smaller sprocket wheel 7 at the other. A cathead 8 is mounted on the line shaft projecting from one side of the frame.

Also mounted upon the base 9 is a drum shaft 10 supported in bearings 11 in the frame. Said drum shaft has thereon a hoisting drum 12 mounted rigidly thereon. Said shaft has at each end thereof a sprocket wheel connection with the drive shaft. A sprocket wheel 13 at one end may be connected with a sprocket 21 on the drive shaft. A sprocket wheel 15 at the opposite end is of larger diameter and may be connected to sprocket wheels 16 on the drive shaft. Either of these connections may be secured upon the shaft for rotation therewith by a clutch. An ordinary dental clutch 17 is shown for the sprocket wheel 13 and a similar dental clutch 18 for the sprocket wheel 15. Both said sprockets are idle on the shaft 10, the clutches 17 and 18 being keyed to the shaft.

With reference to the drive shaft 1, it will be noted that at one end thereof is a sleeve 19 which has at one end thereof a sprocket wheel 20 and at the other end a sprocket wheel 21 which may be termed spaced paired sprockets. The sprocket wheel 20 is adapted to be connected by a chain to the sprocket wheel 6 upon the line shaft. The sprocket wheel 21 is adapted to be connected across by a sprocket chain to the sprocket wheel 13 upon the drum shaft. The clutch member 19 is mounted idly upon the shaft but has a clutch 22 at one end adapted to be engaged with a mating clutch member 23 to secure the sleeve 19 rotatably with the shaft 1.

Upon the opposite end of the shaft 1 is a sleeve 24 which has a sprocket wheel 16 at one end which may be connected across with the sprocket wheel 15 upon the drum. At the other end of the sleeve 24 is a sprocket wheel 25 which is adapted to be connected across with the sprocket wheel 7 upon the line shaft. This sleeve is mounted idly on the shaft but may be clutched thereto by means of the dental clutch 26 which is mounted slidably but non-rotatably upon the shaft 1.

There is a drive from the shaft 1 provided for the rotary which is not shown. This drive includes a sprocket wheel 27 on one end of the shaft projecting beyond the frame, said sprocket wheel being idle upon the shaft but adapted to be connected therewith to the clutch 28. This sprocket wheel may be driven when desired to operate the rotary in the usual manner.

The operation of the hoisting drum may be accomplished through the driving connection at either end of said drum. If a slow speed is desired the sprocket wheel 16 on the drive shaft may be clutched into engagement with the shaft 1 and rotation will be communicated to the sprocket wheel 15, which may be also clutched into engagement with the drum shaft to rotate the drum. A different speed may be obtained through connection of the sprocket wheel 13 at the opposite end of the drum. The drum will be disengaged from the clutch 18 and both the clutch 23 upon the shaft 1 and the clutch 17 upon the shaft 10 may be thrown into engagement and there will be a direct drive to the sprocket wheel 13 upon the drum.

In addition to these direct drives I may clutch the sleeve 19 to the shaft 1 by operating the clutch 23 and the drive may be from the sprocket wheel 20 on the shaft 1 to the sprocket wheel 6 upon the shaft 4. This will, by rotating the shaft 4, communicate a rotation from the sprocket wheel 7 to the sprocket wheel 25 upon the sleeve 24, thus rotating said sleeve. The drive may then be from the sprocket wheel 16 across to the sprocket wheel 15 upon the drum shaft and by engaging the clutch 18 with the sprocket wheel 15 the drum will be rotated with the shaft.

Similarly the clutches may be all disengaged and the clutch 26 on the shaft 1 may be moved into engagement with the clutch upon the sleeve 24 and the sprocket sleeve 24 and the sprocket wheel 25 will thus drive the sprocket wheel 7 on the shaft 4 and by rotating the shaft 4 the sprocket wheels 6 and 20, being connected, will drive the sleeve 19 and from the sprocket wheel 21 on the sleeve 19 a drive connection may be made through the sprocket wheel 13 to the drum shaft. It will be noted on examination of the arrangement shown in Fig. 1 that four separate speeds may be in communication from the drive shaft to the drum. By arrangement of these driving connections it is possible to have only two sprocket wheels upon the drum shaft and these may be spaced wide apart to allow a maximum length of hoisting drum upon the shaft 10. Furthermore, the arrangement is particularly compact so that there are a minimum number of connections across between the shafts.

Figure 2:
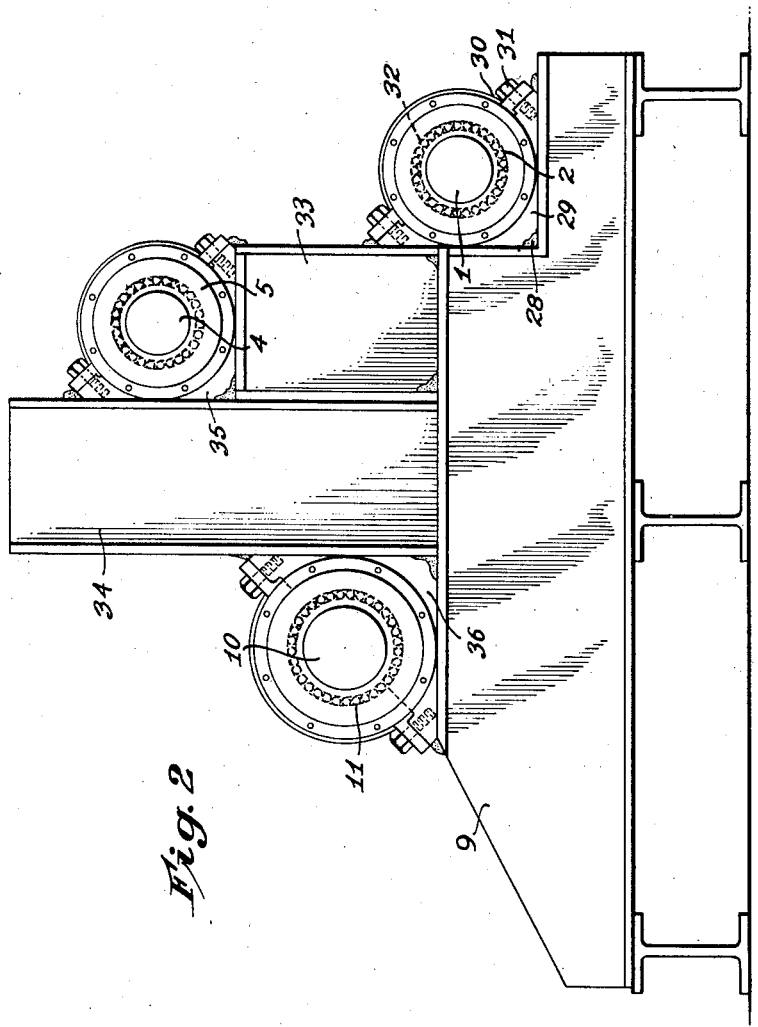
Fig. 2 is an end elevation of the supporting structure showing the manner in which the shafts are mounted at their ends.

Another feature of importance is the sturdy and durable type of supports which are provided for the shafts of the draw works. With reference to Fig. 2, this supporting structure will be more clearly understood. I have the base member 9 mounted upon a support of any desirable construction, the base member comprising two parallel supporting beams at each end of the frame. As will be noted in the drawings, the shaft 1 is supported within an angle 28 formed by cutting away a portion of the upper side of the beam 9 at its end. Within this angle I place a bearing block 29 which may be welded in position on the frame. This block is adapted to receive the shaft which is held in position thereon by a cap member 30 fitting about the shaft and having its end extended to receive the bolts 31, thus securing the shaft bearing in position. It may be understood that anti-friction bearings such as are shown at 32 in dotted lines may be employed in mounting the shaft in position.

In mounting the shaft 4 a similar construction is employed. A short post 33 is mounted upon the beam 9 and adjacent thereto is the jack post 34. These two posts are welded in position upon the base and project upwardly therefrom, the post 33 providing a support for the bearing 35 for the shaft 4.

On the opposite side of the jack post 34 is a bearing support 36 for the drum shaft 10. Each of these bearings are supported upon approximately triangular blocks 29, 35 and 36, which, as previously noted, may be welded into connection with the adjacent portion of the framework. The bearing block 29 thus not only serves to support the shaft but it helps in securing the post 33 in position upon the framework. Similarly the bearing block 35 for the shaft 4 when welded into connection with the posts 33 and 34 will serve as a brace between these posts, helping to form a rigid supporting structure. Also the bearing block 36 when welded in position will help to brace the jack post 34 on that side and assist in forming a sturdy construction, supporting the shafts in their positions.

The structure described is particularly simple and strong and will be enabled to endure the heavy strains to which the device is subjected.

What is claimed is:

1. A draw works of the character described including a supporting frame, a drive shaft, a line shaft and a drum shaft mounted rotatably thereon, a hoisting drum fixed to said drum shaft, a sprocket wheel mounted idly at each end of said reel, means to clutch either of said sprocket wheels to said drum shaft, a sprocket wheel fixed at each end of said line shaft, a sprocket sleeve at each end of said drive shaft mounted rotatably thereon, means to clutch said sleeves to rotate with said shaft, sprocket wheel and chain connections between each of said sleeves and said line shaft sprockets and also between said sleeves and said drum shaft sprocket wheels, and means to rotate said drive shaft.

2. A frame, a drive shaft, a line shaft and a drum shaft rotatable thereon, a hoisting drum rotatable with said drum shaft, means to rotate said drive shaft, a sprocket sleeve at both ends of said drive shaft mounted rotatably thereon, means to independently clutch either of said sleeves to its shaft, a pair of sprockets on each of said sleeves, means to operatively connect one of said sprockets on each sleeve to said line shaft, and means to operatively connect the other of said sprockets on each sleeve to said drum shaft.

3. In combination, a drive shaft, a line shaft and a drum shaft mounted rotatably in parallel relation, means to rotate said drive shaft, a drive sleeve mounted rotatably at each end upon said drive shaft, means to independently connect said sleeves to said drive shaft, driving connections between each sleeve and said line shaft and also with said drum shaft, and a hoisting reel keyed to said drum shaft.

4. In combination, a drive shaft, a line shaft and a drum shaft mounted rotatably in parallel relation, means to rotate said drive shaft, a drive sleeve mounted rotatably at each end upon said drive shaft, means to independently connect said sleeves to said drive shaft, driving connections between each sleeve and said line shaft, a hoisting drum fixed to said drum shaft, a driving member rotatably mounted on said drum shaft at both ends of said drum, driving connections between said sleeves and said driving members, and means to clutch each of said driving members to said drum shaft.

5. A draw works comprising a frame, a drive shaft, a line shaft and drum shaft rotatable therefrom, a hoisting drum fixed on said drum shaft, idle sprocket wheels at each end of said drum, spaced sprocket wheels fixed to said line shaft, spaced pairs of sprockets rotatably mounted on said drive shaft, a driving connection between the sprockets of each pair and said idle sprockets, a driving connection between the other sprocket of each pair and said line shaft sprockets, means to independently clutch said paired sprockets to said drive shaft, and means to rotate said drive shaft.

CARL M. ANDERSON.